United States Patent [19]

MacLeay et al.

[11] Patent Number: 5,206,378

[45] Date of Patent: Apr. 27, 1993

[54] HYDRAZIDO FUNCTIONALIZED 2-(2-HYDROXYPHENYL)-2H-BENZOTRIAZOLES

[75] Inventors: Ronald E. MacLeay; Terry N. Myers, both of Erie, N.Y.

[73] Assignee: Elf Atochem North America, Inc., Philadelphia, Pa.

[21] Appl. No.: 791,716

[22] Filed: Nov. 14, 1991

Related U.S. Application Data

[62] Division of Ser. No. 586,931, Sep. 24, 1990, which is a division of Ser. No. 370,376, Jun. 23, 1989, Pat. No. 4,981,914, which is a division of Ser. No. 84,608, Aug. 12, 1987, Pat. No. 4,868,246.

[51] Int. Cl.$^5$ .............................................. C07D 249/16
[52] U.S. Cl. .................................. 548/259; 548/260; 548/261
[58] Field of Search .................. 548/259, 260, 269

[56] References Cited

U.S. PATENT DOCUMENTS

| | | |
|---|---|---|
| 2,769,804 | 11/1956 | Hanson . |
| 2,849,373 | 8/1958 | Miron . |
| 2,971,939 | 2/1961 | Baer . |
| 2,989,517 | 6/1961 | Hanson et al. . |
| 3,213,058 | 10/1965 | Boyle et al. . |
| 3,336,267 | 8/1967 | Zimmerman et al. . |
| 3,354,016 | 10/1982 | Rashbrook et al. . |
| 3,385,910 | 5/1968 | Tucker . |
| 3,391,110 | 7/1968 | Coleman . |
| 3,483,276 | 12/1969 | Mahlman . |
| 3,488,311 | 1/1970 | Burdick et al. . |
| 3,509,110 | 4/1970 | Di Giulio . |
| 3,553,177 | 1/1971 | Hazen et al. . |
| 3,555,001 | 1/1971 | Wallis et al. . |
| 3,560,455 | 2/1971 | Hazen et al. . |
| 3,560,456 | 2/1971 | Hazen et al. . |
| 3,560,457 | 2/1971 | Hazen et al. . |
| 3,632,561 | 1/1972 | Gibb et al. . |
| 3,723,375 | 3/1973 | Field et al. . |
| 3,755,354 | 8/1973 | Holub et al. . |
| 3,862,087 | 1/1975 | Heller et al. . |
| 3,884,874 | 5/1975 | Rosenberger et al. . |
| 3,884,882 | 5/1975 | Caywood, Jr. . |
| 3,894,083 | 7/1975 | Hofer et al. . |
| 3,919,354 | 11/1975 | Moore et al. . |

(List continued on next page.)

FOREIGN PATENT DOCUMENTS

| | | |
|---|---|---|
| 1180497 | 1/1985 | Canada . |
| 76691 | 4/1983 | European Pat. Off. . |
| 84882 | 8/1983 | European Pat. Off. . |
| 242800 | 10/1987 | European Pat. Off. . |
| 2320310 | 3/1977 | France . |
| 208470 | 5/1984 | German Democratic Rep. . |
| 208471 | 5/1984 | German Democratic Rep. . |
| 46-26860 | 8/1971 | Japan . |
| 59-221314 | 12/1984 | Japan . |
| 59-221315 | 12/1984 | Japan . |
| 60-84378 | 5/1985 | Japan . |

OTHER PUBLICATIONS

D. Bailey et al., "Polymeric Ultraviolet Absorbers", *J. Macronomol Sci. Rev. Macromol Chem.*, C14(2), pp. 167-293 (1976).

G. De Vito et al., "Functionalization of an Amorphous Ethylene-Propylene Copolymer by Free Radical Initiated Grafting of Unsaturated Molecules", *Journal of Polymer Science: Polymer Chem. Ed.*, vol. 22, pp. 1335-1347 (1984).

J. Fertig et al., "Ultraviolet Stabilizing Monomers and (List continued on next page.)

*Primary Examiner*—Bernard Lipman
*Attorney, Agent, or Firm*—Panitch Schwarze Jacobs & Nadel

[57] ABSTRACT

Ultraviolet light stabilizers are chemically bound to anhydride containing polymers or copolymers. Polymeric stabilizers are prepared by the reaction of primary amino or hydrazido-substituted UV absorbers with some or all of the anhydride groups of the polymer or copolymer to form pendant stabilizer substituted imide or amic acid groups. The polymer bound stabilizers are not lost from the polymer system by volatilization, migration, or extraction, even at high temperature. The polymer stabilizers of this invention may be used as they are or as concentrates to stabilize other polymer systems.

8 Claims, No Drawings

U.S. PATENT DOCUMENTS

| | | |
|---|---|---|
| 3,998,907 | 12/1976 | DiGiulio . |
| 4,041,044 | 8/1977 | White . |
| 4,042,773 | 8/1977 | Sheppard et al. . |
| 4,086,242 | 4/1978 | Diehl et al. . |
| 4,097,551 | 6/1978 | DiGiulio et al. . |
| 4,108,943 | 8/1978 | Lee . |
| 4,172,188 | 10/1979 | Balle et al. . |
| 4,258,059 | 3/1981 | Auerbach et al. . |
| 4,341,695 | 7/1962 | Lee et al. . |
| 4,381,373 | 4/1983 | Ikuma . |
| 4,481,315 | 11/1984 | Rody et al. . |
| 4,486,570 | 12/1984 | Lordi et al. . |
| 4,522,983 | 6/1985 | Le-Khac et al. . |
| 4,522,992 | 6/1985 | Verbrugge . |
| 4,533,612 | 8/1985 | Eilingsfeld et al. . |
| 4,591,619 | 5/1986 | Kitsunai et al. . |
| 4,642,350 | 2/1987 | Davatz et al. . |
| 4,675,352 | 6/1987 | Winter et al. . |
| 4,692,486 | 9/1987 | Gugumus . |
| 4,785,063 | 11/1988 | Slongo et al. . |
| 4,892,915 | 1/1990 | Slongo et al. . |
| 4,980,420 | 12/1990 | MacLeay et al. . |
| 4,996,326 | 2/1991 | Leppard et al. . |

OTHER PUBLICATIONS

Polymers. II. Synthesis and Polymerization of Acrylate and Methacrylate Derivatives of 2,1-Dihydroxybenzophenone", *Journal of Applied Polymer Science,* vol. 10, pp. 663-672 (1966).

M. Ghaemy et al., "Mechanisms of Antioxidant Action: The Effectiveness of a Polymer-Bound UV Stabiliser for ABS in Relation to Its Method of Preparation", Polymer Degradation and Stability, vol. 3, pp. 253-263 (1980-81).

Kirk-Othmer, "UV Stabilizers", *Encyclopedia of Chemical Technology,* 3rd Ed., vol. 23, pp. 615-627, John Wiley & Sons.

G. Scott, "New Developments in rubber-Bound Antioxidants", *Rubbercon* '77, pp. 19/1-19/18.

Y. N. Sharma et al., "Structurally Bound Stabilizers: Melt Grafting of UV Stabilizers onto Polypropylene, Polyethylene, and Polystyrene", *Journal of Applied Polymer Science,* vol. 27, pp. 2605-2613 (1982).

P. A. Callais et al., "High Solids Coating Compositions Containing Polymer-Bound Light Stabilizer Acrylic Resins," presented at the Water-Borne & Higher Solids Coating Symposium on Feb. 1-3, 1989.

HYDRAZIDO FUNCTIONALIZED 2-(2-HYDROXYPHENYL)-2H-BENZOTRIAZOLES

CROSS-REFERENCE TO RELATED APPLICATIONS

This is a division of copending U.S. patent application Ser. No. 07/586,931, filed Sep. 24, 1990; which is a division of U.S. patent application Ser. No. 07/370,376, filed Jun. 23, 1989, now U.S. Pat. No. 4,981,914, issued Jan. 1, 1991; which is a division of U.S. patent application Ser. No. 07/84,608, filed Aug. 12, 1987, now U.S. Pat. No. 4,868,246, issued Sep. 19, 1989.

BACKGROUND OF THE INVENTION

This invention relates to polymer bound UV stabilizers. This invention also relates to the use of these polymer bound UV stabilizers to stabilize polymers or polymer blends against photochemical degradation.

When exposed to sunlight or to strong fluorescent illumination, most plastics undergo degradation. This usually results in color development and loss of physical properties. To overcome these problems, polymers are normally protected against photochemical attack by the incorporation of ultraviolet light stabilizers. UV stabilizers initially perform well in plastic compositions; however, they tend to be removed over a period of time by vaporization, migration or degradation under the action of elevated temperatures, or by the action of various solvents and cleaning agents, etc. The plastic compositions then degrade, discolor and in many instances become so brittle they can be easily broken.

Three factors affect the performance of the stabilizer in a polymer composition: the intrinsic activity of the stabilizer functional group on a molar basis, the compatibility or solubility of the stabilizer in the polymer system, and the ability of the stabilizer to remain in the polymer system. The third factor is often the dominant factor (G. Scott, New Developments in Rubber-Bound Antioxidants. Rubbercon 77, Int. Rubber Conf., 1977, 1, paper #19). Consequently, there has been considerable effort toward the development of stabilizers that are less volatile, more compatible and less readily lost during fabrication and exposure to the environment. Engineering thermoplastics are processed at high temperatures. A considerable amount of the additive may be lost when the hot polymers are exposed to the atmosphere or a vacuum (vented extruders) unless the additive has a very low vapor pressure. It is essential to use high molecular weight stabilizers that are not lost through drying, extrusion, and molding steps. Low volatility is also required for applications such as automotive paints where the stabilizer must suffer only minimal loss during oven drying and outdoor exposure (Kirk-Othmer Encyclopedia of Chemical Technology, third Edition, Vol 23, p 619, John Wiley & Sons, New York, NY). For polymers that come in contact with foodstuffs it is essential that the stabilizers be non-toxic or non-extractable from the polymer into the foodstuff. Many of the commercial low molecular weight UV stabilizers are too volatile to be used in these applications. Obviously, polymer bound stabilizers are preferred where FDA approval is required in the end-use.

Various approaches have been used to overcome volatility and compatibility shortcomings. One solution to the volatility and migration problems of UV stabilizers has been to prepare stabilizers with polymerizable groups. The choice then becomes to either polymerize the monomeric stabilizers to form homopolymers for use as additives, copolymerize the stabilizer with another monomer for use as an additive, or incorporate the stabilizer monomer in the preparation of the host polymer. In the homopolymer approach the monomers are often difficult to prepare and the homopolymers are usually incompatible with the polymers to be stabilized (J. Fertig, A. I. Goldberg and M. Shoultchi, J. Appl. Polym. Sci., 10, pp 663 (1966)).

For addition polymers and copolymers, the more popular approach is to copolymerize the polymerizable stabilizer with another monomer, thereby forming either a masterbatch for use as an additive, or simply a polymer or copolymer with sufficient stabilizer attached to the backbone of the (co)polymer chain. (D. bailey, O. Vogl, J. Macromol. Sci.—Rev. Macromol, Chem., C 14(2), pp 267-93 (1976)).

U.S. Pat. No. 4,042,773 demonstrates the attachment of UV absorbers to polymers and copolymers by first attaching the stabilizer onto the initiator used in the preparation of the polymer or copolymer to be stabilized.

Condensation polymers and copolymers have had stabilizer groups incorporated into the polymer backbones by reacting suitably functionalized UV stabilizers with reactive condensation monomers (U.S. Pat. Nos. 3,385,910, 3,391,110, 4,354,016, 3,862,087 and 3,213,058).

Monomeric stabilizers have been grafted onto polymeric backbones by melt processing in a Brabender Plasticizer. However, the extent of the grafting was quite low and most of the ungrafted stabilizer could be readily extracted out of the polymer blend (Y. N. Sharma, M. K. Naqvi, P. S. Gawande, I. S. Bhardwaj, J. Appl. Polym. Sci., 27, pp 2605-13 (1983)).

It is also known in the art to endcap polymers with reactive UV stabilizers (East German Patents 208,470 (CA101:193120z) and 208,471 (CA101:193114a)).

Another method of preparing polymer bound stabilizers is to attach stabilizer groups to existing polymers or copolymers. UV stabilizers containing thiol groups have been attached to rubber modified thermoplastics such as ABS or other rubber lattices using peroxide initiators (G. Scott, M. Ghaemy, Polym. Deg. and Stab., 3(1980-81), 253-263). European Patent Application 84,882 (CA99:141092n) discloses a method of attaching thiol UV stabilizers to rubber modified thermoplastics in the presence of a peroxide initiator in a melt processing step. U.S. Pat. No. 2,849,373 discloses the formation of an ionically bonded benzophenone stabilizer by reacting a polymer with pendant dimethylamino groups with 2-carboxy-2'-hydroxy-4'-methoxybenzophenone thereby producing a salt, with the UV stabilizer ionically bound to the polymer.

Considerable activity has involved modification of copolymers containing reactive functionalities with stabilizers containing groups that react with the reactive functionality of the copolymer. Two examples of this technique are the modification of glycidyl (meth)acrylate copolymers and the modification of maleic anhydride copolymers. Japanese Patent 71/26,860 (CA77: 20857c) covers the attachment of UV stabilizers containing amino groups, hydroxyl groups or isocyanate groups to crosslinked glycidyl methacrylate-divinylbenzene copolymers or crosslinked styrene-maleic anhydride-divinylbenzene copolymers. The attachment is through the respective polymer's reactive epoxide or anhydride groups. A particularly attractive approach to nonmigrating UV absorbers is demonstrated by the reaction of 2-hydroxy-4-(2-hydroxyethoxy)benzophenone with maleic anhydride grafted polyethylene to form a polymer bound 2-hydroxybenzophenone semiester (Japanese Patent 85/84,378, CA103: 161319w).

SUMMARY OF THE INVENTION

The present invention is directed to a polymer with recurring units selected from

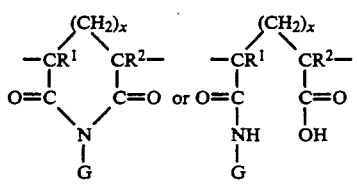

or both in which the units occur either in the polymer backbone, on grafted side chains, as pendant units, or as combinations thereof and wherein x is 0 or 1.

$R^1$ and $R^2$ are independently selected from hydrogen, alkyl of 1 to 6 carbons, cycloalkyl of 5 to 7 carbons, phenyl, chlorine, or bromine.

is the residue of a primary amino or hydrazido substituted stabilizer group selected from (a) 2-hydroxybenzophenones, (b) 2-(2-hydroxyphenyl)-2H-benzotriazoles, (c) aryl salicylates, or (d) oxalic acid amides.

DETAILED DESCRIPTION OF THE INVENTION

In accordance with the invention, polymers containing pendant UV stabilizer groups are prepared from:
a) cyclic anhydride containing polymers or copolymers and reactive UV stabilizer groups with primary amino or hydrazido functionality; or
b) the copolymerization of ethylenic or vinyl aromatic monomers with N-substituted imides (or N-substituted amic acids) of cyclic alpha, beta-unsaturated dicarboxylic acid anhydrides where the N-substituents contain UV stabilizing groups.

Preferably, the cyclic anhydride containing polymer or copolymer is a copolymer of maleic anhydride. The polymer bound UV stabilizer groups are attached as pendant N-substituents on the amide group of the polymer or as N-substituents of intermediate amic acids which are capable of cyclizing to the amide group upon heating above 200° C. The compositons are useful as thermal and light stabilizers for polyolefins, (rubber modified) styrenics and engineering thermoplastics such as poly(phenylene oxide), poly(phenylene ether), polycarbonate and poly blends of these materials.

The ultraviolet light absorbing stabilizer groups (G) of this invention are as follows:
(a) 2-hydroxybenzophenones

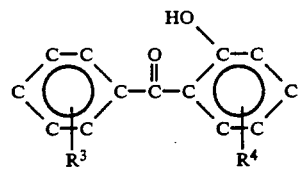

wherein:
$R^3$ and $R^4$ are independently selected from hydrogen, hydroxyl, alkyl of 1 to 8 carbons, alkoxyl of 1 to 4 carbons or a connecting group $X^1$ with the proviso that only one of either $R^3$ or $R^4$ can be connecting group $X^1$. $X^1$ is a direct bond or a divalent radical selected from —NH—C(=O)—(CH$_2$)$_b$—O—, —CH$_2$—CH$_2$—O—, —NH—C(=O)—, —NH—S(=O)$_2$—, —R$^5$—NH—C(=O)—, or —R$^5$—NH—S(=O)$_2$—, in which $R^5$ is alkylene of 2 to 12 carbons.
b is 0, 1, or 2.
Additional substituents for the aromatic nuclei include hydroxyl, alkyl of 1 to 8 carbons, and alkoxy of 1 to 4 carbons.

Preferably, $R^3$ is hydrogen, hydroxyl or alkoxy of 1 to 4 carbons, $R^4$ is the connecting group $X^1$, $X^1$ is —NH—C(=O)—(CH$_2$)$_b$—O— or —CH$_2$—CH$_2$—O—, and b is 1 or 2. Most preferably, $R^3$ is hydrogen or alkoxy of 1 to 4 carbons, $R^4$ is $X^1$ and $X^1$ is —NH—C(=O)—(CH$_2$)$_b$—O—, and b is 1.

(b) 2-(2-hydroxyphenyl)-2H-benzotriazoles:

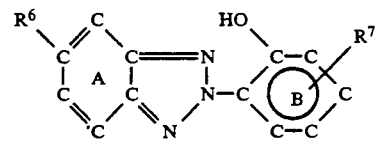

wherein:
$R^6$ may be hydrogen, alkyl of 1 to 4 carbons, alkoxy of 1 to 4 carbons, carboxyl, alkoxycarbonyl of 2 to 11 carbons, carboxylic acid amide, chlorine, bromine, sulfonic acid, alkylsulfonyl, or the connecting group $X^2$.
$R^7$ may be hydrogen, alkyl of 1 to 8 carbons, aralkyl of 7 to 12 carbons, aryl of 6 to 14 carbons or the connecting group $X^3$.
$X^2$ is a divalent radical selected from —NH—C(=O)— and —NH—S(=O)$_2$—
$X^3$ is a direct bond or a divalent radical selected from —NH—C(=O)—(CH$_2$)$_b$—C(=O)—NH—(CH$_2$)$_y$, —NH—C(=O)—(CH$_2$)$_b$—NH—(CH$_2$)$_y$—, —NH—C(=O)—(CH$_2$)$_2$—, —(CH$_2$)$_y$—, —NH—C(=O)—(CH$_2$)$_z$—S—CH$_2$—C(=O)—NH—(CH$_2$)$_y$—, —NH—C(=O)—(CH$_2$)$_b$—O—, —NH—C(=O)—, and —CH$_2$CH$_2$O— in which b is as previously defined, y is 1, 2, or 3, and z is 1 or 2.
Additional substituents for rings A and B include alkyl of 1–4 carbons, alkoxy of 1–4 carbons and halogen (Cl, Br). The substitution must be such that one and only one of the substituents ($R^6$ and $R^7$) is the connecting group.
Preferably, $R^6$ is hydrogen or chlorine, $R^7$ is $X^3$, $X^3$ is —NH—C(=O)—(CH$_2$)$_b$—O—, —NH—C(=O)—(CH$_2$)$_z$—S—CH$_2$—C(=O)—NH—(CH$_2$)$_y$—, —(CH$_2$)$_y$—, —CH$_2$CH$_2$O—,

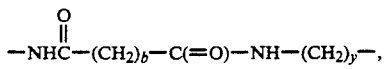

or —NH—C(=O)—(CH$_2$)$_z$—, y is 1 or 2, b is 1 or 2, and z is 1 or 2.

Most preferably, R$^6$ is hydrogen, R$^7$ is X$^3$, X$^3$ is —(CH$_2$)$_y$—,

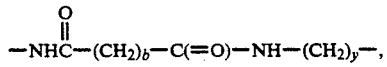

—NH—C(=O)—(CH$_2$)$_b$—O— or —NH—C(=O)—(CH$_2$)$_z$, y is 1, z is 2 and b is 1.

(c) Aryl salicylate derivatives:

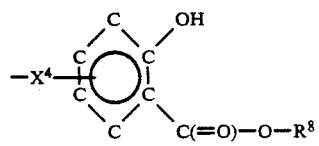

wherein:
R$^8$ is substituted or unsubstituted aryl of 6 to 10 carbon atoms.
X$^4$ is a direct bond or diradical selected from:

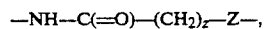

—NH—C(=O)—(CH$_2$)$_z$—Z—,

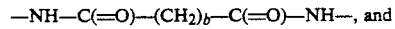

—NH—C(=O)—(CH$_2$)$_b$—C(=O)—NH—, and

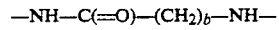

—NH—C(=O)—(CH$_2$)$_b$—NH— in which b and z are as previously defined.
Z is selected from —NH—, —S—, or —O—.
Preferably, R$^8$ is unsubstituted or substituted aryl of 6 to 8 carbons, and X$^4$ is —NH—C(=O)—(CH$_2$)$_b$—C(=O)—NH—. Most preferably, R$^8$ is phenyl and X$^4$ is —NH—C(=O)—(CH$_2$)$_b$—C(=O)—NH— wherein b is 0.

(d) Oxalic acid amide derivatives of the structure:

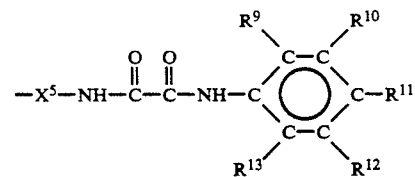

wherein:
R$^9$ is selected from hydrogen, hydroxyl, alkoxy, or alkylthio of 1 to 12 carbons, acyloxy or acylthio of 2 to 12 carbons, alkyl of 1 to 8 carbons, aryl of 6 to 12 carbons, chlorine or bromine.
R$^{10}$, R$^{11}$, R$^{12}$, and R$^{13}$ are independently selected from hydrogen, alkyl of 1 to 8 carbons, aryl of 6–12 carbons, aralkyl of 7 to 13 carbons, alkoxy or alkylthio of 1 to 12 carbons, chlorine, bromine, or alkoxycarbonyl of 2 to 8 carbons.
X$^5$ is a direct bond, alkylene of 2 to 12 carbons, aralkylene of 7 to 13 carbons, or alkenylene of 3 to 12 carbons.
Preferably, R$^9$ is hydroxyl or alkoxy of 1 to 4 carbons, R$^{10}$, R$^{11}$, R$^{12}$, and R$^{13}$ are independently selected from hydrogen or alkyl of 1 to 4 carbons, and X$^5$ is a direct bond. Most preferably, R$^9$ is ethoxy, R$^{11}$, R$^{12}$, R$^{13}$, and R$^{14}$ are hydrogen and X$^5$ is a direct bond.

Examples of the 2-hydroxybenzophenones which may be reacted with the anhydride polymers or copolymers include the following:
(4-benzoyl-3-hydroxyphenoxy)acetylhydrazide,
4-amino-2-hydroxybenzophenone,
2-hydroxy-4-(2-aminoethoxy)benzophenone,
(4-(2-hydroxybenzoyl)-3-hydroxyphenoxy)acetylhydrazide,
(4-(4-methoxybenzoyl)-3-hydroxyphenoxy)acetylhydrazide,
4-(4-benzoyl-3-hydroxyphenoxy)butenoic acid hydrazide,
2-(2',4'-dihydroxybenzoyl)benzoic hydrazide, and
2-(2'-hydroxy-4'-methoxybenzoyl)benzoic hydrazide.

Examples of the 2-(2-hydroxyphenyl)-2H-benzotriazoles include the following:
3-(3-(2H-benzotriazol-2-yl)-4-hydroxy-5-t-butylphenyl)propionhydrazide,
3-(3-(5-chloro-2H-benzotriazol-2-yl)-4-hydroxy-5-t-butylphenyl)propionhydrazide,
3-(3-(2H-benzotriazol-2-yl)-4-hydroxy-5-methylphenyl)propionhydrazide,
3-(3-(2H-benzotriazol-2-yl)-2,6-dihydroxyphenyl)propionhydrazide,
3-(3-(5-chloro-2H-benzotriazol-2-yl)-4-hydroxy-5-methylphenyl)propionhydrazide,
2-(4-amino-2-hydroxyphenyl)-2H-benzotriazole,
2-(4-amino-2-hydroxyphenyl)-5-hydroxy-2H-benzotriazole,
2-(4-amino-2-hydroxyphenyl)-5-chloro-2H-benzotriazole,
2-[2-hydroxy-5-(aminomethyl)phenyl]-2H-benzotriazole,
2-[2-hydroxy-3-(aminomethyl)-5-methylphenyl]-2H-benzotriazole,
(4-(2H-benzotriazol-2-yl)-3-hydroxyphenoxy)acetyl hydrazide,
(4-(5-methoxy-2H-benzotriazol-2-yl)-3-hydroxyphenoxy)acetyl hydrazide,
(4-(5-chloro-2H-benzotriazol-2-yl)-3-hydroxyphenoxyacetyl hydrazide, and
3-(2H-benzotriazol-2-yl)-4-hydroxybenzoic acid hydrazide.

Examples of the salicyclic acid derivatives include the following:
phenyl 4-aminosalicylate and
N-(3-hydroxy-4-(phenoxycarbonyl)phenyl)-N'-aminooxamide.

Examples of oxamides include the following:
N-(2,4,6-trichlorophenyl)-N'-aminooxamide,
N-(2,4,6-tribromophenyl)-N'-aminooxamide,
N-(2-ethoxyphenyl)-N'-aminooxamide,
N-(2-methoxyphenyl)-N'-aminooxamide,
N-(2-ethylphenyl)-N'-aminooxamide,
N-(2-methylphenyl)-N'-aminooxamide,
N-(4-methoxycarbonylphenyl)-N'-aminooxamide,
N-(2-methoxycarbonylphenyl)-N'-aminooxamide,
N-(4-chlorophenyl)-N'-aminooxamide,
N-(4-bromophenyl)-N'-aminooxamide,
N-(4-methoxyphenyl)-N'-aminooxamide,
N-(2-octyloxyphenyl)-N'-aminooxamide,
N-(2-ethoxy-5-t-butylphenyl)-N'-aminooxamide,
N-(2-methoxy-3,5-di-t-butyl-6-methylphenyl)-N'-aminooxamide,
N-(2-methoxy-3-t-butyl-5-methyl)-N'-aminooxamide,
N-(2-methoxy-3,5-di-t-butylphenyl)-N'-aminooxamide, N-(2-methoxy-5-t-butylphenyl)-N'-aminooxamide,
N-(2-ethoxyphenyl)-N'-(4-aminophenyl)oxamide,
N-(2-ethylphenyl)-N'-(3-aminophenyl)oxamide,
N-(2-ethoxyphenyl)-N'-(6-aminohexyl)oxamide, and
N-(2-methoxyphenyl)-N'-(2-aminoethyl)oxamide.

In general, any polymer or copolymer containing pendant cyclic anhydride groups, either on the polymer backbone or grafted side chains, is suitable for attachment of the reactive stabilizers to form the polymer bound UV stabilizers of this invention. Due to cost and ease of preparation, the anhydride containing polymers are preferably polymers or copolymers of maleic anhydride.

To illustrate the broad nature of this invention, several types of anhydride containing copolymers useful in this invention will be described: (a) styrene-maleic anhydride copolymers, (b) alternating copolymers of maleic anhydride and alpha-olefins, (c) copolymers of alkyl vinyl ethers and maleic anhydride, (d) maleic anhydride modified polyolefins, (e) maleic anhydride adducts of hydrogenated polymers or copolymers, (f) maleic anhydride adducts of EPDM, and (g) other anhydride copolymers.

(a) Styrene-maleic Anhydride Copolymers

These copolymers are a general class of compounds of alternating copolymers of styrene and maleic anhydride, or the non-equimolar copolymers containing less than about 50 mole percent of the anhydride monomer. The styrene may be replaced in whole or in part by other vinylaromatic monomers such as alpha-methylstyrene, nuclear methylstyrenes, ethyl-styrene, iso-propylstyrene, t-butylstyrene, chloro-styrenes, dichlorostyrenes, bromostyrenes, dibromostyrenes, vinylnaphthalene and the like. Similarly, the maleic anhydride can be replaced in whole or in part by another alpha, beta-unsaturated cyclic dicarboxylic acid anhydride such as itaconic, aconitic, citraconic, mesaconic, chloromaleic, bromomaleic, dichloromaleic, dibromomaleic, phenylmaleic, and the like. The preferred alpha, beta-unsaturated cyclic anhydride is maleic anhydride. The copolymer may also contain a termonomer such as 1-3 carbons alkyl acrylate or methacrylate, acrylonitrile, methacrylonitrile, acrylamide, methacrylamide, acrylic acid or methacrylic acid.

Suitable copolymers may be prepared by any of the several methods available for the preparation of styrene-maleic anhydride copolymers or they may be purchased commercially. Non-equimolar copolymers may be prepared by solution polymerization directly from the respective monomers by the incremental addition of the reactive monomer as taught by U.S. Pat. No. 2,971,939, by a continuous recycle polymerization process such as described in U.S. Pat. Nos. 2,769,804 and 2,989,517, by the suspension polymerization process described in U.S. Pat. No. 3,509,110, or by numerous known variations.

Also suitable are the rubber-modified copolymers where 5 to 40 percent by weight of one of the known elastomers has been incorporated into the vinylaromatic-alpha, beta-unsaturated dicarboxylic acid anhydride copolymer. The elastomers may be incorporated into the anhydride copolymers by blending, mixing, or copolymerizing the monomers in the presence of the rubber.

Suitable rubbers, or elastomers, include conjugated 1,3-diene rubbers, styrene-diene copolymer rubbers, acrylonitrile-diene copolymer rubbers, ethylene-propylene copolymer rubbers, ethylene-propylene-diene terpolymer rubbers, acrylate-diene copolymer rubbers, and mixtures thereof.

Preferred rubbers or diene rubbers such as homopolymers of conjugated dienes such as butadiene, isoprene, chloroprene, and piperylene and copolymers of such dienes with up to 50 mole percent of one or more copolymerizable mono-ethylenically unsaturated monomers, such as styrene, substituted styrenes, acrylonitrile, methacrylonitrile and isobutylene.

Preferably, the elastomers are incorporated into the monomer mixture prior to polymerization using, for example, the method of U.S. Pat. No. 4,097,551 of U.S. Pat. No. 4,486,570 in which a mixture of at least two rubbery additives are present during the polymerization.

Particularly suitable for use are the non-equimolar copolymers of styrene and maleic anhydride designated Dylark TM copolymers, commercially available from ARCO Chemical Company. Suitable Dylark TM copolymers include those of the 200 series and the 300 series and Dylark TM 600 and 700. Those copolymers designated Dylark TM 250, Dylark TM 350 and Dylark TM 700 are impact modified and are especially useful.

The SMA TM resins are low molecular weight styrene-maleic anhydride copolymers (MW 700–1900) and are also useful in this invention. The low molecular weight SMA resins SMA TM 1000, 2000 and 3000 are also useful in this invention.

Also suitable are the styrene-maleic anhydride copolymers or rubber modified styrene-maleic anhydride copolymers where a portion of the maleic anhydride groups are converted to maleimide groups or N-substituted maleimide groups. The partially imidated copolymers can be prepared by treating the SMA polymer with a primary amine in a post polymerization step as described in U.S. Pat. No. 3,998,907 or during the polymerization as described in U.S. Pat. No. 4,381,373.

The molar ratio of the amine to the maleic anhydride in the copolymer should be less than 0.8 to allow attachment of the stabilizer groups. The formation of the maleimide groups that don't contain stabilizer groups may be formed before, during or after the formation of the maleimide groups containing stabilizer groups. Suitable amines for this purpose are ammonia, primary alkyl amines and primary aryl amines. Long chain primary alkyl amines will beneficially aid in flow properties of the system while primary aryl amines will increase the thermal stability and heat distortion properties of the system. Aniline is the preferred aromatic amine for increasing the thermal stability of the polymer system. Brominated or chlorinated primary amines will increase the fire retardancy of the system.

The SMA copolymer may optionally contain a termonomer such as a 1-3 carbons alkyl acrylate or methacrylate, acrylonitrile, methacrylonitrile, acrylamide, methacrylamide, acrylic acid or methacrylic acid. Rubber modified terpolymers of styrene, maleic anhydride and alkyl (1-3 carbons) methacrylates are described in U.S. Pat. No. 4,341,695. Incorporation of the methacrylate comonomer at specific levels (2 to 20% by weight) increases the heat distortion temperature of the polymer, raises the tensile strength and increases the gloss of the rubber-modified polymer. The polymer composition is conveniently prepared by dissolving the rubber in a solution of the monoalkenyl aromatic component and the methacrylate ester in a suitable solvent and then polymerizing the solution with the anhydride component in the manner described in, for example, U.S. Pat. Nos. 2,971,939, 3,336,267 and 3,919,354.

The Cadon ™ resins (Monsanto Chemical Company) are a commercial series of styrenemaleic anhydride polymer alloys with ABS. Rubber-modified versions are also available and are also suitable for this invention.

Also suitable are the rubber modified styrene maleic anhydride resins described in U.S. Pat. No. 4,522,983 where a minor amount of a nuclear substituted methylstyrene is included in the composition to increase the impact strength of the composition.

The styrene-maleic anhydride polymers may be further modified by copolymerizing the monomers in the presence of other monomers. In addition to the acrylates, methacrylates acrylonitrile and methacrylonitrile previously mentioned, other suitable monomers include the ethlenically unsaturated carboxylic acids, preferably acrylic and methacrylic acids, acrylamide and methacrylates such as dimethylaminoalkyl (1–6 carbons) acrylate or methacrylate such as dimethylaminoethyl acrylate or methacrylate, and vinyl esters derived from saturated carboxylic acids of 2 to 22 carbon atoms such as vinyl acetate or vinyl propionate.

Further modification of the styrene-maleic anhydride copolymers can be accomplished by carrying out the copolymerization in the presence of crosslinking monomers having two or more ethylenically unsaturated double bonds such as divinylbenzene, 1,4-butadiene, divinyl ether, ethylene glycol dimethacrylate, butanediol dimethacrylate, triallyl cyanurate and similar type compounds. The crosslinking monomers are employed in amounts of from 0.01 to 5, preferable from 0.1 to 2 mole percent based on maleic anhydride.

(b) Alternating Copolymers of Maleic Anhydride and Alpha-olefins

These copolymers are exemplified by U.S. Pat. Nos. 3,553,177, 3,560,455, 3,560,456 and 3,560,457. Each of these patents describes a copolymer of maleic anhydride with a specific alpha-olefin such as 12 to 30 carbon alpha-olefins. The copolymers of 6 to 10 carbon alpha-olefins are disclosed in U.S. Pat. No. 3,488,311. Terpolymers of maleic anhydride and at least one lower alpha-olefin and at least one higher alpha-olefin are also known, as shown by Canadian Patent 1,180,497. PA-18 is an example of a commercially available alternating copolymer of maleic anhydride and octadecene-1.

Also suitable for this invention are the terpolymers disclosed in U.S. Pat. Nos. 4,522,992 and 3,723,375. These are basically terpolymers of cyclic alpha, beta-unsaturated dicarboxylic acid anhydrides, aromatic mono-alkenyl monomers and higher 1-alkenes. Preferably, they are terpolymers of styrene, maleic anhydride and alpha-olefins having 10 or more carbon atoms. Both pure alkenes and mixed alkenes can be utilized in preparing the terpolymers.

(c) Copolymers of Alkyl Vinyl Ethers and Maleic Anhydride

These copolymers are readily prepared in bulk or solution using free radical initiators (e.g., lauroyl peroxide) (British Patent 1,117,515). Low, medium, and high molecular weight grades are commercially available. Commercial grades include the Gantrez ™ resins (General Aniline and Film). Suitable alkyl vinyl ethers for copolymerization include methyl, ethyl, propyl, isopropyl, n-butyl, isobutyl, amyl, isoamyl, hexyl, heptyl, octyl, 2-ethyl hexyl, nonyl, decyl, dodecyl, hexadecyl, and octadecyl vinyl ethers.

(d) Maleic Anhydride Modified Polyolefins

These polymers have the following formula:

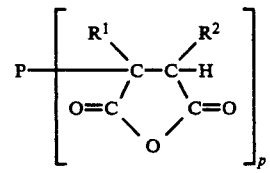

where P- represents an olefin polymer residue which is based on a preponderance of ethylene, propylene or 1-butene, and having a valence of p. It can be either a high or low density polyethylene residue, a polypropylene residue or a residue of a copolymer of ethylene with 1-butene, a residue of a copolymer of ethylene and propylene, a residue of a propylene-butene copolymer or a residue of such a propylene copolymer with an olefin having up to about six carbon atoms.

The maleic anhydride-modified polyolefins are materials containing about 0.2 to 9% by weight of combined maleic anhydride, preferably about 2 to 5%. One embodiment of these materials is a commercially available product, sold under the trademark "Hercoprime ™" by Hercules Inc. Polyethylene or polypropylene modified with maleic anhydride is available commercially under the trademark "Plexar ™". Any polymer or copolymer of ethylene, propylene, or 1-butene can be modified via the maleic anhydride moiety to form the substrate molecule, including polyethylene, polypropylene, ethylene-propylene copolymer, propylenebutene-1 copolymer, or butene-1-ethylene copolymer. The most frequently encountered and the preferred maleic anhydride modified polyolefin is that based on polypropylene.

The preparation of maleic anhydride modified polypropylene is described in U.S. Pat. No. 3,483,276. Briefly, the preparation consists of exposing the olefin polymer to a material or condition which will induce the formation of active, free radical sites thereon with which maleic anhydride can react. Active centers can be induced, e.g., by subjecting the polymer to the action of high energy ionizing radiation such as gamma rays, X-rays, or high speed electrons, by contacting it, either as a solid or a solution in a solvent, with a free radical producing material such as dibenzoyl peroxide, dilauroyl peroxide, dicumyl peroxide or t-butyl perbenzoate, or by simply milling it in the presence of air. The preferred method is the reaction of the polyolefin with maleic anhydride in solvent solution in the presence of a free radical initiator.

The olefin polymer based maleimides of the invention are prepared by graft modifying the appropriate polymer backbone with a maleic anhydride and thereafter reacting said anhydride modified olefin polymer with stabilizers containing primary amino or hydrazide functional groups. A less preferred method is to modify the appropriate polymer backbone with N-(stabilizer substituted)maleimides of formula:

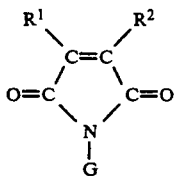

where $R^1$, $R^2$ and G are as previously defined.

The graft modification of EPDM by maleic anhydride in the presence of dicumyl peroxide and benzoyl peroxide is described by DeVito and co-workers (G. DeVito, N. Lanzetta, G. Maglio, M. Malinconico, P. Musta, R. Palumbo, J. Polym. Sci., Polym. Chem, Ed., 22, pp 1335–47 (1984)).

(e) Maleic Anhydride Adducts of Hydrogenated Polymers or Copolymers

These are polymeric products containing pendant succinic anhydride groups which are formed by reacting maleic anhydride with hydrogenated polymers of conjugated dienes or hydrogenated copolymers of conjugated dienes and vinyl aromatic hydrocarbons containing a residual unsaturation level of from 0.5 to 20 percent of their original unsaturation level prior to hydrogenation. The reaction, which is conducted by heating a mixture of the maleic anhydride and hydrogenated polymer or copolymer containing residual unsaturation, proceeds by means of a reaction mechanism referred to as an "ENE" type reaction. The maleic anhydride adds to the unsaturation of the polymer to form the polymer product containing the pendant succinic anhydride groups. This polymer, by virtue of the pendant anhydride groups, can be reacted with stabilizers containing primary amino or hydrazide groups to form the polymer bound stabilizers of the invention.

The amounts of maleic anhydride employed in the reaction can vary considerably depending on the specific nature of the hydrogenated polymer and the properties desired in the final product. In general, the amount of maleic anhydride employed may range from 0.1 to about 25 percent by weight based on total weight of maleic anhydride and hydrogenated polymer with a preferred amount being from 0.2 to 5 percent by weight.

Various polymers of conjugated dienes and copolymers of conjugated dienes and vinyl aromatic hydrocarbons may be hydrogenated for use in preparing the maleic anhydride adduct component of the compositions of the invention. Polymers of conjugated dienes which may be hydrogenated include polymers derived from one or more conjugated diene monomers. Thus, polymers derived from a single conjugated diene such as 1,3-butadiene (i.e., a homopolymer) or polymers derived from two or more conjugated dienes such as, for example, 1,3-butadiene and isoprene or 1,3-butadiene and 1,3-pentadiene (i.e., a copolymer) and the like may be utilized. Copolymers which may be hydrogenated include random copolymers of conjugated dienes and vinyl aromatic hydrocarbons and block copolymers of conjugated dienes and vinyl aromatic hydrocarbons which exhibit elastomeric properties.

(f) Maleic Anhydride Adducts of EPDM

These are prepared by the thermal addition of maleic anhydride to elastomeric copolymers of ethylene and propylene which have a substancially saturated hydrocarbon backbone chain and unsaturated hydrocarbon side-chains. The preparation of these adducts is described in U.S. Pat. No. 3,884,882.

(g) Other Anhydride Copolymers

Examples of these copolymers are as follows:
1) vinyl acetate-maleic anhydride copolymer,
2) ethylene-vinyl acetate-maleic anhydride terpolymer,
3) isobutylene-maleic anhydride copolymer,
4) graft polyols containing styrene-maleic anhydride copolymer in the grafted chain,
5) styrene-maleic anhydride-2,4,6-tribromophenyl acrylate terpolymer,
6) maleic anhydride-divinylbenzene-styrene terpolymer,
7) ethylene-maleic anhydride-styrene graft copolymer,
8) methyl methacrylate-maleic anhydride copolymers,
9) butyl methacrylate-maleic anhydride-styrene copolymer, and
10) ethylene-maleic anhydride copolymers.

Other suitable maleic anhydride copolymers include the terpolymers of anhydrides, aromatic mono-alkenyl monomers and higher 1-alkenes described in U.S. Pat. No. 4,522,992, the tribromophenyl acrylate-epichlorohydrin-maleic anhydride-styrene copolymer described in U.S. Pat. No. 4,108,943, and the methyl methacrylate-maleic anhydride-styrene copolymers disclosed in Japanese Patents 59/221,314 and 59/221,315 (CA102: 150317x and 150318y), divinyl ether-maleic anhydride copolymers from Adica Labs (Pivan), a polybutadiene-polystyrene-maleic anhydride terpolymer referred to as Ricon TM 184/MA, a product of Colorado Chemical Specialties, Inc., and ethylene/vinyl acetate copolymer grafted with maleic anhydride such as Modic E 310 K a product of Mitsubishi Chemical Industries Co.

In addition, poly(maleic anhydride) such as Belcene, a product of Ciba-Geigy, is also suitable in this invention.

Anhydride polymers containing glutaric anhydride units can also be used in this invention. Such polymeric anhydrides are available from polymers and copolymers of acrylic and methacrylic acid by heating under dehydrating conditions, with or without a catalyst (European Patent 76,691).

Synthesis

The polymer bound UV stabilizers of this invention can be prepared by adding the reactive UV stabilizer to the anhydride polymer or copolymer under reactive conditions. It is within the scope of this invention to employ mixtures of functionalized UV stabilizers. Whether a single functionalized UV stabilizer or multiple functionalized UV stabilizers are used, the total equivalents of UV stabilizer should not exceed the equivalents of anhydride in the polymer or copolymer. Additional reactive species can be attached to the polymers or copolymers. To properly adjust the stoichiometry of multiple reactive additives, the relative anhydride content of the polymer or copolymer substrate must be considered. It have been found that the least reactive stabilizers can be advantageously added first and the more reactive ones later in the preparation. Alternately, the stabilizers can be blended together and added to the anhydride polymer or copolymer under reactive conditions.

The reaction of the reactive stabilizers with anhydride polymers or copolymers may be carried out in inert solvents such as benzene, toluene, xylene, mesitylene, chlorobenzene, dimethylformamide, tetrahydrofuran and aliphatic hydrocarbons. In some cases the reaction may stop at the intermediate amic acid or partial conversion of the amic acid to the imide may occur. The amic acids cyclize to the desired imides at higher temperatures.

Preferably, the reactive stabilizers are attached to the anhydride polymers or copolymers by a melt blending step in the absence of a solvent. This can be accomplished at a temperature above the softening point of the anhydride polymer or copolymer using any conventional melt mixing apparatus such as a plastograph, Banbury mixer, two roll mill, single or twin screw extruder or any other method which applies sufficient heat (e.g., 175° to 275° C.) and shear to the ingredients to obtain a satisfactory blend. Preferably, the reaction should be carried out in an inert atmosphere such as nitrogen.

The reaction may be carried out for times varying from 30 seconds to 48 hours depending upon the degree of conversion of the anhydride to imide desired, the reactivity of the reactive stabilizers, the reaction temperature employed, the presence or absence of a solvent, and the use or non-use of a catalyst. The temperature range includes from 20° C. to the decomposition temperature of either starting material. At lower reaction temperatures, the reactive UV stabilizers become attached to the polymers as amic acid derivatives. For solution reactions, temperatures are conveniently controlled by judicious choice of solvents within an appropriate boiling range. Temperatures in this case range from 20° C. to approximately 225° C., preferably from 75° C. to 200° C. and most preferably from 110° C. to 200° C. Reaction times for solvent reaction range from several minutes to 40 hours. Higher reaction temperatures will reduce time for conversion to the desired product(s). Preferably, solvent reaction times will be between 15 minutes and 8 hours and most preferably between 15 minutes and 4 hours. In addition, azeotropic water removal from the solvent will facilitate most solvent reactions.

Appropriate temperatures for melt processing the reactive components can range from 20° C. to greater than 300° C. in the case of engineering thermoplastics. Generally, the preferred range is from the softening temperature of the starting polymer to about 300° C. Most preferably, the temperature range will be from 150° C. to 300° C. The time required at the higher temperatures of melt processing are preferably from 30 seconds to 8 hours and most preferably from 30 seconds to about 1 hour.

As reaction temperatures are increased, as in the case of engineering thermoplastics, the amic acids initially formed tend to cyclize to imides. Imide formation in most cases is assured by temperatures exceeding 225° C.

In addition, the polymer bound stabilizers can be prepared in the presence of inert polymers such as HIPS, ABS, SAN, MBS, ASA, polystyrene, polyolefins, various copolymers of polystyrene and rubbery materials, poly (phenyl oxide), poly(phenylene ether) and various combinations thereof. These stabilized polymer alloys or blends can be prepared in solution or in a melt blending step in any conventional melt mixing apparatus such as a Banbury mixer or an extruder. In addition, once the stabilizers are attached to the anhydride polymers or copolymers, the modified anhydride polymer or copolymer (or modified anhydride polymer or copolymer blend) may be blended with polymers or copolymers containing reactive carbonyl groups such as nylon, polycarbonate, polyesters and polyarylates.

It is within the scope of this invention that the anhydride polymers or copolymers may be partically imidized with ammonia, primary alkyl or aromatic amines and the residual anhydride groups either totally or partially reacted with the reactive stabilizers to form maleimide groups. Likewise, the anhydride polymers or copolymers may be reacted with the reactive stabilizers groups first and then the residual anhydride groups either totally or partially reacted with ammonia, primary alkyl or aromatic amines or the anhydride copolymers may be reacted simultaneously with the reactive stabilizers and the primary amines. A particularly preferred embodiment is to partially imidize the anhydride copolymer with a 8-200 carbon primary alkyl amine or mono amine-terminated poly(oxyalkylene). Small amounts of amine-terminated Jeffamines (primary amine terminated block copolymers of ethylene oxide and propylene oxide, products of Texaco Chemical Company) will contribute advantageous mold release properties to the polymers or copolymers. These 8-200 carbons alkyl or poly(oxyalkylene) substituents will also lower the Tg of the modified copolymers, increase their compatibility with other polymeric compositions such as polyolefins, lower processing temperatures, increase melt flow and may also contribute to lubricating properties.

Residual carboxyl or anhydride groups may be reacted with aqueous bases or metallic oxides to form ammonium or metal salts along the polymer. Care must be taken to avoid saponification of the stabilizer groups.

It is also within the scope of this invention that the anhydride polymers or copolymers may be partially imidized with other functionalized amines or hydrazides which will add additional properties to the polymers or copolymers. For example, attachment of trialkoxysilylalkylamines such as aminomethyltrimethoxysilane, 3-aminopropyltriethoxysilane or 3-aminopropyltri(n-propyloxy)silane (see U.S. Pat. No. 3,755,354). Alkoxysilane groups enhance the ability of the polymer or copolymer system to accept fillers. Likewise, reaction of chlorinated or brominated primary amines or hydrazides will contribute flame retardant properties to the polymers or copolymers. Antistatic properties can be introduced in a similar manner. For example, the anhydride copolymers may be partially reacted with 3-dimethylaminopropylamine to form the 3-dimethylaminopropylimide and then in a subsequent step the dimethylaminopropyl group may be quarternized with an alkyl halide such as methyl iodide (see U.S. Pat. No. 3,555,001).

When the attachments are run in solution, the products can be isolated by removal of the solvent or by precipitation of the product in a non-solvent such as methanol or hexane. In the latter case, the product is separated from the solvent, washed with fresh non-solvent and dried in an oven at elevated temperature, preferably under vacuum or an inert atmosphere.

When the attachments are carried out in a mixer in the molten state, the blended product is cooled, ground up in a grinder or pelletized and dried in an oven at elevated temperatures, preferably, under vacuum or an inert atmosphere. When the reaction is carried out in an extruder, the extrudate is cooled, either by an inert gas or by a cooling bath, dried if necessary, pelletized or ground up and, if necessary, redried in an oven.

It is generally beneficial to attach stabilizing groups to the anhydride polymers or copolymers which will provide synergistic stabilizing effects. This would reduce the concentration requirements of the polymer bound additives thereby providing economic benefits.

The polymer bound stabilizers of this invention are useful as light stabilizers for synthetic polymers which are normally subject to actinic light degradation. Depending upon the mode of attachment, other benefits may be gained. When the attachment is accomplished by reacting the anhydride polymer or copolymer with a hydrazide functionalized stabilizer, the resulting polymer may exhibit enhanced thermal stability.

Since the stabilizer groups are bound to polymers, they will not be lost from the polymer system by volatilization, migration or extraction even at high temperatures. This makes these stabilized polymers especially attractive in food grade applications.

The polymer bound stabilizers of this invention can be used by themselves as stabilized compositions or they may be blended with other polymers to form stabilized blends. When blending with other polymers it is advantageous to try to match the polymer backbone of the anhydride containing copolymer with the polymer or copolymer to be stabilized. For example, better results are obtained when stabilizing polypropylene, if the stabilizer groups are attached to an octadecene-maleic anhydride copolymer rather than a styrene-maleic anhydride copolymer. Likewise, the styrene-maleic anhydride copolymers are more suitable for attachment of the stabilizer groups when stabilizing styrenics.

Concentrates of the polymer bound stabilizers in other polymers can be used as masterbatches to stabilize other polymer systems. For example, masterbatches of modified Dylark ™ resins in polystyrene may be blended with poly(phenylene oxide)-polystyrene blends to stabilize them against photochemical degradation. The amount of concentrate required will depend on the stabilizer groups attached, their concentration in the concentrate, additional additives present, the particular polymer system to be stabilized, and the degree of stabilization desired.

In general it is advisable to have about 0.01 to 5% by weight of the active stabilizer group (i.e., the UV stabilizer group) in the final polymer or copolymer blend. A preferred range is from about 0.05 to about 2% by weight and a more preferred range is from about 0.05 to about 1% by weight of each active stabilizer group.

At times it may be beneficial to add extraneous additives which will act as synergists with one or more of the polymer bound stabilizer groups. Some synergistic systems application to this invention would include the following non-exclusive examples:
1) hindered amines and 2-(2-hydroxyphenyl)-2H-benzotriazoles
2) hindered amines and 2-hydroxybenzophenones
3) hindered phenols and 2-hydroxybenzophenones In addition hindered amines, 2-hydroxybenzophenones, 2-(2-hydroxyphenyl)-2H-benzotriazoles, and phenyl salicylates all would provide synergistic effects with added phosphite stabilizers.

The polymer bound UV stabilizers of this invention can be used together with other additives to further enhance the properties of the finished polymer. Examples of other additives that can be used in conjunction with the stabilizers of this invention include entioxidants such as alkylated monophenols, alkylated hydroquinones, hydroxylated thiodiphenyl ethers, alkylidene-bis-phenols, hindered phenolic benzyl compounds, acylaminophenols, esters of 3-(3,5-di-t-butyl-4-hydroxyphenyl)propionic acid, esters of 3-(5-t-butyl-4-hydroxy-3-methylphenyl)propionic acid, 3-)3,5-di-t-butyl-4-hydroxyphenyl)propionic acid amides; UV absorbers and light stabilizers such as 2-(2'-hydroxyphenyl)-2H-benzotriazoles, 2-hydroxybenzophenones, benzylidene malonate esters, esters of substituted or unsubstituted benzoic acids, diphenyl acrylates, nickel chelates, oxalic acid diamides, hindered amine light stabilizers; other additives such as metal deactivators, phosphites and phosphonites, peroxide decomposers, fillers and reinforcing agents, plasticizers, lubricants, corrosion and rust inhibitors, emulsifiers mold release agents, pigments, carbon black, fluorescent brighteners, both organic and inorganic flame retardants and non-dripping agents, melt flow improvers and antistatic agents. Numerous examples of suitable additives of the above type are given in Canadian Patent 1,190,038.

If higher levels of a stabilizer are attached to the anhydride polymer or copolymer, it may be used as a stabilizer concentrate and may be blended with other polymers or copolymers.

Examples of polymers and copolymers which may be stabilized by these polymeric UV stabilizers include:
1. Polyolefins such as high, low and linear low density polyethylenes, which may be optionally crosslinked, polypropylene, polyisobutylene, poly(methylbutene-1), polyacetylene and in general polyolefins derived from monomers having from two to about ten carbon atoms and mixtures thereof.
2. Polyolefins derived from diolefins such as polybutadiene and polyisoprene.
3. Copolymers of mono or diolefins such as ethylene-propylene, propylene-butene-1 propylene-isobutylene and ethylene-butene-1 copolymer.
4. Terpolymers of ethylene and propylene with dienes (EPDM) such as butadiene, hexadiene, dicyclopentadiene and ethylidene norbornene.
5. Copolymers of alpha-olefins with acrylic acid or methacrylic acids or their derivatives such as ethylene-acrylic acid, ethylene-methacrylic acid and ethylene-ethyl acrylate copolymers.
6. Styrenic polymers such as polystyrene (PS) and poly(p-methylstyrene).
7. Styrenic copolymers and terpolymers such as styrene-butadiene (SBR), styrene-allyl alcohol and styrene-acrylonitrile (SAN), styrene-acrylonitrile (SAN), styrene-acrylonitrile-methacrylate terpolymer, styrene-butadiene-styrene block copolymers (SBS), rubber modified styrenics such as styrene-acrylonitrile copolymers modified with acrylic ester polymer (ASA), graft copolymers of styrene on rubbers such as polybutadiene (HIPS), polyisoprene or styrene-butadiene-styrene block copolymers (Stereon ™ from Firestone Synthetic Rubber and Latex Co.), graft copolymers of styrene-acrylonitrile on rubbers such as butadiene (ABS), polyisoprene or styrene-butadiene-styrene block copolymers, graft copolymers of styrene-methyl methacrylate on rubbers such as polybutadiene (MBS), butadiene-styrene radial block copolymers, (e.g., KRO 3 of Phillips Petroleum Co.), selectively hydrogenated butadiene-styrene block copolymers (e.g. Kraton G from Shell Chemical Co.) and mixtures thereof.
8. Polymers and copolymers derived from halogen-containing vinyl monomers such as poly(vinyl chloride), poly(vinyl fluoride), poly(vinylidene chloride), poly(vinylidene fluoride), poly(tetrafluoroethylene) (PTFE), vinyl chloride-vinyl acetate copolymers, vinylidene chloride vinyl acetate copolymers, and ethylene-tetrafluoroethylene copolymers.
9. Halogenated rubbers such as chlorinated and/or brominated butyl rubbers or polyolefins and fluoroelastomers.
10. Polymers and copolymers derived from alpha, beta-unsaturated acids, anhydrides, ester, amides and nitriles or combinations thereof such as polymers and copolymers of acrylic and methacrylic acids, alkyl and/or glycidyl acrylates and methacrylates, acrylamide and methacrylamide, acrylonitrile, maleic anhydride, maleimide, the various anhydride containing polymers and copolymers described in this disclosure, copolymers of the above polymers and various blends and mixtures thereof as well as rubber modified versions of the above polymers and copolymers.
11. Polymers and copolymers derived from unsaturated alcohols or their acylated derivatives such as poly(vinyl alcohol), poly(vinyl acetate), poly(vinyl stearate), poly(vinyl benzoate), polu(vinyl maleat), poly(vinyl butyral), poly(alyl phthalate), poly(allyl diethylene glycol carbonate) (ADC), ehtylene-vinyl acetate copolymer and ethylene-vinyl alcohol copolymers.
12. Polymers and copolymers derived from unsaturated amines such as poly(allyl melamine).
13. Polymers and copolymers derived from epoxides such as polyethlene oxide, polypropylene oxide and copolymers thereof as well as polymers derived from bis-glycidyl ethers.
14. Poly(phenylene oxides), poly(phenylene ethers) and modifications thereof containing grafted polystyrene or rubbers as well as their various blends with polystyrene, rubber modified polystyrenes or nylon.
15. Polycarbonates and especially the aromatic polycarbonates such as those derived from phosgene and bisphenols such as bisphenol-A, tetrabromobisphenol-A and tetramethylbisphenol-A.
16. Polyester derived from dicarboxylic acids and diols and/or hydroxycarboxylic acids or their corresponding lactones such as polyalkylene phthalates (e.g., polyethylene terephthalate (PET), polybutylene terephthalate (PBT), and poly(1,4-dimethylcyclohexane terephthalate) or copolymers thereof and polylactones such as polycaprolactone.
17. Polyarylates derived from bisphenols (e.g., bisphenol-A) and various aromatic acids such as isophthalic and terephthalic acids or mixtures thereof.
18. Aromatic copolyestercarbonates having carbonate as well as ester linkages present in the backbone of the polymers such as those derived from bisphenols, iso- and terephthaloyl chlorides and phosgene.
19. Polyurethanes and polyureas.
20. Polyacetals such as polyoxymethylenes and polyoxymethylenes which contain ethylene oxide as a comonomer.
21. Polysulfones, polyethersulfones and polyimidesulfones.
22. Polyamides and copolyamides which are derived from diamines and dicarboxylic acids and/or from aminocarboxylic acids or the corresponding lactones such as the following nylons: 6, 6/6, 6/10, 11 and 12.
23. Polyimides, polyetherimides, polyamideimides and copolyethersters.
24. Cross-linked polymers which are derived from aldehydes on the one hand and from phenols, ureas and melamine on the other hand such as phenol-formaldehyde, urea-formaldehyde and melemine-formaldehyde resins.
25. Alkyl resins such as glycerol-phthalic acid resins and mixtures thereof with melamine-formaldehyde resins.
26. Unsaturated polyester resins which are derived from copolyesters of saturated and unsaturated dicarboxylic acids with polyhydric alcohols as well as from vinyl compounds (crosslinking agents) and also halogen-containing, flame resistant modifications thereof.
27. Natural polymers such as cellulose, natural rubber as well as the chemically modified homologous derivatives thereof such as cellulose acetates, cellulose ethers such as methyl and ethyl cellulose.

In addition, the polymer bound stabilizers of this invention may be used to stabilize various combinations or blends of the above polymers or copolymers. They are particularly useful in the stabilization of polyolefins, acrylic coatings, styrenics, rubber modified styrenics poly(phenylene oxides) and their various blends with styrenics, rubber-modified styrenics or nylon.

EXAMPLES

The following reactive additives were used in the preparation of the polymer bound stabilizers of the examples:
A. (4-benzoyl-3-hydroxyphenoxy)acetylhydrazide (MW=285)
B. (4-(2H-benzotriazol-2-yl)-3-hydroxyphenoxy)acetyl hydrazide (MW=300)
C. N-(3-hydroxy-4-(phenoxycarbonyl)phenyl N'-aminooxamide (MW=315)
D. Jeffamine TM M-360
E. Zinc Oxide Reactive stabilizer A was prepared by the hydrazinolysis of the corresponding methyl or ethyl ester. Reactive additive C was prepared from phenyl 4-aminosalicylate in a two step procedure: (1) reaction of the amine with ethyl oxalyl chloride and (2) hydrazinolysis of the amide-ester thus formed.

The following maleic anhydride copolymers were used in the preparation of the polymer bound stabilizers of the examples.

SMA TM 1000 is a low molecular weight alternating copolymer of styrene and maleic anhydride with number average molecular weight of approximately 1600.

SMA TM 2000 is a low molecular weight copolymer of styrene and maleic anhydride containing approximately 2 styrene units for each maleic anhydride unit and has a number average molecular weight of approximately 1700.

SMA TM 3000 is a low molecular weight copolymer of styrene and maleic anhydride containing approximately 3 styrene units for each maleic anhydride unit and has a number average molecular weight of approximately 1900. These SMA resins are products of the Arco Chemical Company, Division of Atlantic Richfield Company.

EMA-1103 is an alternating ethylene-maleic anhydride copolymer and was obtained from the Monsanto Chemical Co.

Cadon TM resins are a commercial series of styrene-maleic anhydride polymer alloys with ABS and were obtained from the Monsanto Chemical Co.

PA-18 is a copolymer of 1-octadecene and maleic anhydride and was obtained from Chevron Chemical Co. It has a molecular weight of about 50,000.

Gantrez ™ AN 119 is a methyl vinyl ether-maleic anhydride copolymer commercially available from GAF.

The Dylark ™ resins are high molecular weight non-equimolar copolymers of styrene and maleic anhydride commercially available from Arco Chemical Company. Dylark ™ 240 and 250 are rubber modified while Dylark ™ 232 is not. Dylark ™ 150 is prepared by polymerizing about 92% by weight styrene monomer and about 8% by weight maleic anhydride, in the presence of about 18 parts by weight Stereon ™ Rubber 720 (Firestone Synthetic Rubber and Latex Co.) per 100 parts of combined styrene and maleic anhydride.

Ricon ™ 184/MA is a polybutadiene-polystyrene-maleic anhydride terpolymer and is a product of Colorado Chemical Specialties, Inc.

The HIPS used was Dow Styron ™ 489W.

EXAMPLE 1

Preparation of [4-(2H-benzotriazol-2-yl)-3-hydroxyphenoxy]acetyl hydrazide (Compound B)

1. Preparation of ethyl [4-(2H-benzotriazol-2-yl)-3-hydroxyphenoxy]acetate

Into a 500 ml flask equipped with a reflux condenser were combined 2-(2,4-dihydroxyphenyl)-2H-benzotriazole (15.8 g, 0.07 mole, prepared according to the procedure of Li et al, Monatsh, Chem., 115, 853–868 (1984)), ethyl chloroacetate (8.6 g, 0.07 mole), potassium carbonate (15 g), potassium iodide (0.5 g) and 250 ml acetone. The reaction mixture was refluxed for 30 hours, cooled and poured into a beaker containing 1.5 liters of water. The solution was acidified with concentrated hydrochloric acid and the solid precipitate collected on a buchner funnel. The solid was recrystallized from ethanol yielding 8.1 g of gray-purple crystals (mp 115°–117° C.). This material was recrystallized a second time from ethanol yielding 7 g of gray-purple crystals (mp 118°–120° C.). Liquid chromatographic analysis of this material showed it to consist of a singular component. The infrared spectrum of this material showed the ester carbonyl at 1750 cm$^{-1}$. The UV absorption spectrum of this material gave λmax(THF)=342, molar absorptivity=23000.

2. Preparation of Compound B

Into a 125 ml flask equipped with a magnetic stirrer were combined, the ester prepared above (3.1 g, 0.01 mole), 30 ml of isopropanol, and 6 ml of 54% hydrazine (aqueous). This mixture was allowed to stir at ambient temperature for 5 hours, and then was poured into a beaker containing 400 ml water and 17.9 g of acetic acid. The mixture was stirred for 5 minutes (pH=5). The solid product was isolated on a Buchner funnel and washed with additional water. The solid was transferred to another beaker and slurried with 5% sodium bicarbonate (stirred for 1 hour) then isolated again and air dried on the funnel yielding 2.7 g of pink crystals. The infrared spectrum of this material showed the hydrazide carbonyl at 1680 cm$^{-1}$. The UV absorption spectrum of this material gave λmax(THF)=342, molar absorptivity=26000.

Elemental analysis: theoretical % C=56.19%, % H=4.38%, % N=23.40%, % O=16/04%; found % C=55.56%, % H=4.60%, % N=22.53%, % O=17.92%.

EXAMPLE 2

Attachment by Melt Blending of Compound A into Rubber Modified Styrene/Maleic Anhydride Copolymer and HIPS Into the 200° C. mixing compartment of a Brabender Prep Center Mixer kept under a nitrogen atmosphere were placed 50 g of Dylark ™ 250 and 150 g of Styron ™ 498 W. This blend was mixed for 5 minutes at 20 RPM to allow formation of a uniform blend. At this time, 11.45 g (0.04 mole) of Compound A were added over a 3 minute period with the mixer operating at 60 RPM. The temperature rose to 214° C. and the mixing rate was lowered to 40 RPM. The blend was mixed under these conditions for 7 minutes while the temperature dropped to 208° C. The product was removed hot and cooled in a water bath, then dried in an oven at 60° C. The polymer blend was ground up in a grinder and redried. An infrared spectrum of the polymer taken in chloroform solution indicated that the anhydride had been converted to imide having a strong carbonyl absorption at 1740 cm$^{-1}$. Part of the polymer was dissolved in chloroform and precipitated in methanol to give a light yellow product. An infrared spectrum indicated the presence of UV stabilizer in the precipitated polymer.

EXAMPLE 3

Attachment by Melt Blending of A into Styrene/Maleic Anhydride Copolymer and Polystyrene Into the 200° C. mixing compartment of a Brabender Prep Center Mixer kept under a nitrogen atmosphere were placed 50 g of Dylark ™ 232 and 150 g of Polystyrene. This blend was mixed for 5 minutes at 20 RPM to allow formation of a uniform blend. At this time, 13.2 g (0.048 mole) of Compound A were added over a 3–4 minute period. The blend was mixed under these conditions for 5–6 minutes. The product was removed hot and cooled in a water bath, then dried in an oven for 2 hours at 80° C. The polymer blend was ground up in a grinder. An infrared spectrum of the polymer taken in chloroform solution indicated that the anhydride has been converted to imide having a strong carbonyl absorption at 1735 cm$^{-1}$ and weak residual anhydride absorption at 1780 cm$^{-1}$. The polymer was dissolved in 100 ml of refluxing chloroform and precipitated in 800 ml of methanol. The precipitate was slurried with additional methanol and filtered again to give a very light, almost white polymer. An infrared spectrum indicated that presence of the UV stabilizer in the precipitated polymer. Thermal analysis of this polymer indicated two glass transition temperatures (Tg) of 131° and 106° C.

EXAMPLE 4

Reaction of Various Styrene/Maleic Anhydride Copolymers with A in Solution

Into a 500 ml round bottom flask equipped with a Dean-Stark trap and condenser were placed 25 g of Dylark ™ 232, 8.3 g (0.028 mole) of Compound A, and 200 ml of xylene. This mixture was heated to boiling and refluxed for 2 hours with azeotropic removal of water as it formed. The solvent was stripped and the solid polymer was dissolved in 500 ml of chloroform; then it was precipitated in 4 liters of methanol. The polymer was collected by filtration and further dried under high vacuum. The product was a white solid weighing 27.3 g and having a Tg of 119° C. The infrared spectrum of the polymer showed an imide carbonyl band at 1720 cm$^{-1}$ and a residual anhydride carbonyl band at 1770 cm$^{-1}$.

Alternately, the following maleic anhydride copolymers were used with similar results:

Cadon TM 127 (7.0 g) and A (3.0 g) gave 10 g of white polymer with two Tg's of 104° C. and 144° C., compared to 130° C. for unmodified Cadon TM 127. The infrared spectrum of the polymer showed an imide carbonyl band at 1735 cm$^{-1}$.

Gantrez TM AN-169 (3.7 g) and A (6.9 g) gave 9.3 g of slightly yellow polymer with Tg of 162° C., compared to 158° C. for unmodified Gantrez TM AN-169.

PA-18 Resin (5.6 g) and A (4.6 g) gave 9 g of yellow polymer with Tg of 160° C., compared to 90° C. for unmodified PA-18. The infrared spectrum of the polymer showed an imide carbonyl band at 1720 cm$^{-1}$ and a residual anhydride carbonyl band at 1770 cm$^{-1}$.

EMA-103 (15 g) and A (6.9 g) gave 21 g of slightly yellow polymer with Tg of 149° C., compared to 136° C. for unmodified EMA-103. The infrared spectrum of the polymer showed an imide carbonyl band at 1720 cm$^{-1}$ and a residual anhydride carbonyl band at 1780 cm$^{-1}$.

EXAMPLE 5

Attachment of Compound A to Ricon TM 184 MA Resin

Into a 500 ml round bottom flask equipped with a Dean-Stark trap and condenser were placed 19.8 g of Ricon TM 184 MA and 200 ml of xylene. This mixture was heated to boiling and refluxed for 1 hour to dry the polymer. The solution was cooled slightly and 2.9 g (0.01 mole) of Compound A were added. The reaction mixture was refluxed for another hour with water removal. The solvent was stripped using an aspirator and high vacuum systems (vessel warmed with steam). The product was a very viscous brown liquid weighing 24.5 g. An infrared spectrum of this polymer showed the imide carbonyl band at 1735 cm$^{-1}$ and residual anhydride carbonyl band at 1785 cm$^{-1}$. Analysis of this polymer by liquid chromatography using an UV detector (254 nm) clearly showed that the polymeric material had enhanced UV absorbance over unmodified Ricon TM 184 MA. This further verifies the attachment of the UV absorber to the polymer.

EXAMPLE 6

Attachment of Compound B to Styrene/Maleic Anhydride Copolymer

Into a 250 ml flask equipped with a stirrer, nitrogen atmosphere, and Dear Stark trap, were combined 11.0 g of Dylark TM 150 and 100 of xylene. This was heated to reflux for 30 minutes to dry the polymer. To this was added Compound B (2.0 g) and refluxing with removal of water was continued for 3 hours. The xylene was stripped under reduced pressure (aspirator and high vacuum systems). The polymer residue was taken up in 500 ml tetrahydrofuran and filtered to remove unreacted hydrazide. After filtration the amount of solvent was reduced to about 200 ml and the product precipitated by addition of this solution to 1200 ml of hexane. The polymer product was isolated by filtration and dried for 3 days in a vacuum oven yielding 9.8 g of light tan solid. The Tg of the polymer was 128° C., compared to 120° C. for unmodified Dylark TM 150. The infrared spectrum showed the imide carbonyl at 1737 cm$^{-1}$ and residual anhydride at 1782 cm$^{-1}$.

EXAMPLE 7

Attachment of Compound C to Styrene/Maleic Anhydride Copolymer

Into a 500 ml round bottom flask equipped with a Dean-Stark trap, condenser, nitrogen atmosphere, and mechanical stirrer were placed 15 g SMA TM 2000 and 200 ml of xylene. The resulting solution was refluxed with azeotropic removal of water for 30 minutes to dry the polymer. The solution was cooled slightly and 9.2 g (0.03 mole) of Compound C was added. The mixture was refluxed for 1 hour with removal of water as formed. The mixture was cooled and the polymer precipitate collected by filtration. The product was ground up in a blender with hexane and filtered again. The resulting white solid was dried under high vacuum yielding 18.3 g of material. The infrared spectrum of this polymer showed the imide carbonyl band at 1720 cm$^{-1}$, a residual anhydride carbonyl band at 1780 cm$^{-1}$, a broad carbonyl band for the oxalic dicarbonyls and the aromatic ester at about 1680 cm$^{-1}$. This material melted at 280°-300° C.

EXAMPLE 8

Attachment of Compound A to Styrene/Maleic Anhydride Copolymer

Into mixing chamber of a Brabender Prep Center Mixer were placed 30.0 g of SMA TM 1000 and 0.075 g of Irganox TM 1076. The mixture was kept under a nitrogen blanket while mixing at 40-50 RPM. Compound A (37.0 g, 0.13 mole) was added over a 5 minute period. Mixing was continued an additional 15 minutes to assure a complete reaction. The product mass was ground to a pale yellow powder in a mortar and with a pestle. Infrared analysis of this material confirmed the attachment of the UV absorber. Analysis for residual Compound A showed it to be present to the extent of 0.1%. The UV spectrum of the polymer showed two absorbances due to the attached UV absorber of λmax 286, E(1%,THF, 1 cm)=290; λmax 327, E(1% THF, 1 cm)=180. The Tg of the polymer was 155° C. By differential scanning calorimetry the polymer was heated at 10° C. per minute without decomposition up to 300° C.

EXAMPLE 9

Attachment of Compounds A and D to Styrene/Maleic Anhydride Copolymer

Into a 500 ml flask equipped with a stirrer, nitrogen atmosphere, and Dean Stark trap, were combined 15.0 g SMA TM 1000 and 200 ml of xylene. This was heated to reflux in an attempt to dry the polymer. An insoluble lump formed. To this was added Compound D (10.8 g) which softened the lump and began immediate water removal as the azeotrope. Refluxing with removal of water was continued for an hour. The reaction mixture was cooled slightly and Compound A (8.6 g, 0.03 mole) was added. The mixture was brought to reflux and heating continued for 1 hour. The xylene was stripped under reduced pressure (aspirator and high vacuum systems) to yield 33.7 g of yellow solid. The UV spectrum of the polymer showed two absorbances due to the attached UV absorber at λmax 282, E(1%, THF,1 cm)=150; λmax 323, E(1%,THF,1 cm)=74. The Tg of the polymer was 78.5° C. By differential scanning calorimetry, the polymer was heated at 10° C. per minute without decomposition up to 250° C. The infrared spectrum showed the imide carbonyl at 1740 cm$^{-1}$ and residual anhydride at 1780 cm$^{-1}$.

EXAMPLE 10

Attachment of Compound A to Styrene/Maleic Anhydride Copolymer with Compound E Into the 200° C, mixing chamber of a Brabender Prep Center Mixer were placed 220.0 g of Cadon TM 127 and 2.2 g of zinc oxide. The mixture was blended for 5 minutes. Compound A (35.8 g, 0.12 mole) was added and mixing was continued an additional 5 minutes. The product mass was removed from the mixer, cooled, and ground to pale yellow chips. Infrared analysis of this material showed an imide carbonyl band at 1720 cm$^{-1}$ and a residual anhydride carbonyl band at 1780 cm$^{-1}$. The Tg of this material was determined to be 127° C., compared to 130° C. for unmodified Cadon TM 127.

EXAMPLE 11

Accelerated Weathering of HIPS Stabilized with Compound A Attached to SMA TM 1000

A. Preparation of Compound A/SMA 1000 Masterbatch

Into the 190° C. mixing chamber of a Brabender Plastograph were placed 30.0 g of SMA TM 1000 and 0.075 g of Irganox TM 1076. The mixture was blended for 5 minutes at 40 RPM. Compound A (39.0 g) was added over a 5 minute period and mixing was continued an additional 10 minutes. The product mass was removed from the mixer, cooled and ground to pale yellow powder.

B. Preparation of Test Samples

FORMULATION 1: Into the 200° C. mixing chamber of a Brabender Prep Center Mixer was placed 250.0 g HIPS which was allowed to melt over a period of 5 minutes. To this was added 2.1 g of the stabilizer masterbatch prepared above. The mixture was blended an additional 10 minutes. The product mass was removed from the mixer, cooled and ground to pale yellow granules. This procedure was repeated five more times to prepare sufficient material for molding.

FORMULATION 2: By a similar procedure, a test composition was prepared in which the stabilizer (Compound A) was attached to the SMA TM 1000 at the same time as both of these were being blended with the HIPS. For this composition, 249 g of HIPS, 1.0 g of SMA TM 1000, 1.25 g of Compound A, and 0.003 g of Irganox TM 1076 were used.

FORMULATION 3: As a control, the same procedure was used to blend 249 g of HIPS and 1.25 g of Uvinul TM 408 (2-hydroxy-4-octoxybenzophenone). Each of these formulations contain 0.5% of a UV stabilizer. These three stabilized HIPS blends were injection molded into tensile bars using a Newbury 25 ton injection molder.

C. Accelerated Weathering

The tensile bars prepared above were weathered in a QUV Accelerated Weathering Instrument. The instrument was equipped with FS-40 bulbs, and the weathering cycle consisted of 8 hours light exposure at 60° C. and 4 hours condensation in the dark at 50° C. Samples were removed after certain time periods and changes in polymer properties were determined. The results are recorded in Table I. These results clearly demonstrate the advantage of this invention.

TABLE I

| ACCELERATED WEATHERING TEST RESULTS | | | | | | |
|---|---|---|---|---|---|---|
| PROPERTY | QUV EXPOSURE, HOURS | | | | | |
| & FORMULATION | 100 | 270 | 570 | 700 | 770 | 1000 |
| IZOD IMPACT RETAINED, % | | | | | | |
| 1 | 86 | 75 | 75 | 82 | | 71 |
| 2 | | | | | 67 | |
| 3 | 83 | 72 | 66 | 59 | | 59 |
| YID CHANGE* | | | | | | |
| 1 | 17 | 31 | 38 | 41 | | 40 |
| 2 | | | | | 37 | |
| 3 | 19 | 36 | 45 | 46 | | 56 |
| TOTAL COLOR CHANGE** | | | | | | |
| 1 | 9 | 15 | 18 | 20 | | 20 |
| 2 | | | | | 118 | |
| 3 | 9 | 17 | 21 | 21 | | 26 |

*Yellowness Index change according to ASTM D1925
**Total color according to CIE lab 1976 color scale L*A*B*

What is claimed:

1. A hydrazido functionalized 2-(2-hydroxyphenyl)-2H-benzotriazole compound having a formula:

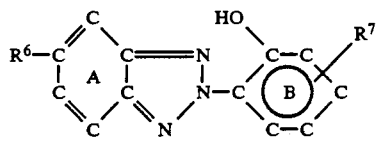

wherein
R$^6$ is hydrogen, alkyl of 1 to 4 carbons, alkoxy of 1 to 4 carbons, carboxyl, alkoxycarbonyl of 2 to 11 carbons, carboxylic acid amide, chlorine, bromine, sulfonic acid, alkylsulfonyl or a primary hydrazido group H$_2$N—X$^2$,
R$^7$ is hydrogen, alkyl of 1 to 8 carbons, aralkyl of 7 to 12 carbons, aryl of 6 to 14 carbons or a primary hydrazido group X$^3$—NH$_2$,
wherein only one of the substituents R$^6$ or R$^7$ must be a primary hydrazido group H$_2$N—X$^2$ for R$^6$ or X$^3$—NH$_2$ for R$^7$,
X$^2$ is —NH—C(═O)— or —NH—S(═O)$_2$—,
X$^3$ is
—(CH$_2$)$_y$—NH—C(═O)—(CH$_2$)$_b$—C(═O)—NH—
—(CH$_2$)$_y$—NH—(CH$_2$)$_b$—C(═O)—NH—
—(CH$_2$)$_2$—C(═O)—NH—
—(CH$_2$)$_y$—NH—C(═O)—CH$_2$—S—(CH$_2$)$_z$—C(═O)—NH—
—O—(CH$_2$)$_b$—C(═O)—NH— or —C(═O)—NH— in which b is 0, 1 or 2, y is 1, 2 or 3, and z is 1 or 2 and rings A and B may be additionally substituted by alkyl of 1 to 4 carbons, alkoxy of 1 to 4 carbons, chlorine or bromine.

2. The compound of claim 1 wherein
R$^6$ is hydrogen or chlorine,
R$^7$ is X$^3$—NH$_2$,
X$^3$ is
—O—(CH$_2$)$_b$—C(═O)—NH—
—(CH$_2$)$_y$—NH—C(═O)—CH$_2$—S—(CH$_2$)$_z$—C(═O)—NH—

—$(CH_2)_y$—NH—C(=O)—$(CH_2)_b$—C(=O)—NH— or

—$(CH_2)_2$—C(=O)—NH— where b is 0, 1 or 2, y is 1 or 2 and z is 1 or 2 and additional substituents for ring B may be alkyl groups of 1 to 4 carbons.

3. The compound of claim 2 wherein $R^6$ is hydrogen, $R^7$ is $X^3$—$NH_2$, $X^3$ is —O—$(CH_2)_b$—C(=O)—NH— or

—$(CH_2)_2$—C(=O)—NH— where b is 1 and y is 1 and additional substituents for ring B may be alkyl groups of 1 to 4 carbons.

4. The compound of claim 3 wherein $R^6$ is hydrogen, $R^7$ is $X^3$—$NH_2$, $X^3$ is —$(CH_2)_2$—C(=O)—NH— on ring B para to the hydroxyl group and ring B is additionally substituted with an alkyl group of 1 to 4 carbons ortho to the hydroxyl group.

5. The compound of claim 4 wherein the additional ring B alkyl group substituent is a t-butyl group.

6. The compound of claim 3 wherein $X^3$ is —O—$(CH_2)_b$—C(=O)—NH— on ring B meta to the hydroxyl group and ring B contains no additional substituents.

7. The compound of claim 2 wherein $R^6$ is hydrogen, $R^7$ is $X^3$—$NH_2$ $X^3$ is —$(CH_2)_y$—NH—C(=O)—$(CH_2)_b$—C(=O)—NH—, b is 0 or 2 and y is 1, $X^3$ is substituted on ring B ortho to the hydroxyl group and ring B contains an additional alkyl substituent of 1 to 4 carbons para to the hydroxyl group.

8. The compound of claim 7 wherein b is 0 and the additional alkyl substituent on ring B is a methyl group.

* * * * *